United States Patent

Loyd et al.

[11] Patent Number: 5,996,574
[45] Date of Patent: Dec. 7, 1999

[54] OVERFLOW PAN ASSEMBLY WITH SPLASHGUARD CAP

[75] Inventors: Dennis G. Loyd; Lois B. Loyd, both of Cawker City, Kans.

[73] Assignee: Dennis G. Loyd Trust, Cawker City, Kans.

[21] Appl. No.: 09/309,738

[22] Filed: May 11, 1999

Related U.S. Application Data

[60] Provisional application No. 60/103,707, Oct. 9, 1998.

[51] Int. Cl.$^6$ .................................................. A47J 27/58
[52] U.S. Cl. .......................... 126/386; 126/384; 126/389; 220/203.03; 220/912
[58] Field of Search .................................... 126/386, 385, 126/384, 389, 357, 373; 220/202, 203.03, 367.1, 373, 366.1, 374, 912; 99/331, 413, 446, 467, 444

[56] References Cited

U.S. PATENT DOCUMENTS

| | | |
|---|---|---|
| 504,243 | 8/1893 | Philippot . |
| 1,461,366 | 7/1923 | Mulford et al. . |
| 1,676,146 | 7/1928 | Krafft . |
| 1,810,860 | 6/1931 | Tremblay . |
| 1,970,454 | 8/1934 | Hellmann ................................ 126/386 |
| 2,127,988 | 8/1938 | Tarrant ......................................... 53/1 |
| 2,177,171 | 10/1939 | Crews .................................... 126/386 |
| 2,385,594 | 9/1945 | Witte, Jr. ................................. 126/384 |
| 3,730,167 | 5/1973 | Desarzens ............................... 126/386 |
| 4,485,801 | 12/1984 | Hodges .................................. 126/386 |
| 5,033,453 | 7/1991 | Loyd et al. ............................. 126/384 |
| 5,193,524 | 3/1993 | Loyd et al. ............................. 126/389 |

FOREIGN PATENT DOCUMENTS

| | | |
|---|---|---|
| 26919 | 11/1920 | Denmark . |
| 696673 | 9/1940 | Germany . |

*Primary Examiner*—James C. Yeung
*Attorney, Agent, or Firm*—John K. Flanagan; John R. Flanagan; Flanagan & Flanagan

[57] ABSTRACT

An overflow pan assembly includes a pan, cap, pair of first handles and pair of second handles. The pan has a lower cooking chamber formed by a bottom wall and annular shaped lower side wall and an upper reservoir chamber formed above the lower cooking chamber by an annular shaped upper side wall and annular shaped ledge extending between and interconnecting the lower side wall and upper side wall. The cap has an inner splash chamber inside the cap formed by a top wall and annular shaped side wall and an outer catch chamber outside the cap formed by the side wall of the cap and upper side wall and ledge of the pan. The first handles are mounted to the upper side wall of the pan opposite one another. The second handles are mounted to the side wall of the cap opposite one another. The second handles are pairable with and restable upon the first handles such that the cap can be placed in an opened position spaced above the pan leaving a gap therebetween above the ledge of the pan for allowing fluid to pass between the lower cooking chamber and outer catch chamber. The second handles are separable from the first handles such that the cap can be placed in a closed position upon the ledge of the pan closing the gap and preventing passage of fluid therethrough. A rotatable vent closure member and vent holes are provided on the cap to relieve pressure in the splash chamber of the cap.

20 Claims, 3 Drawing Sheets

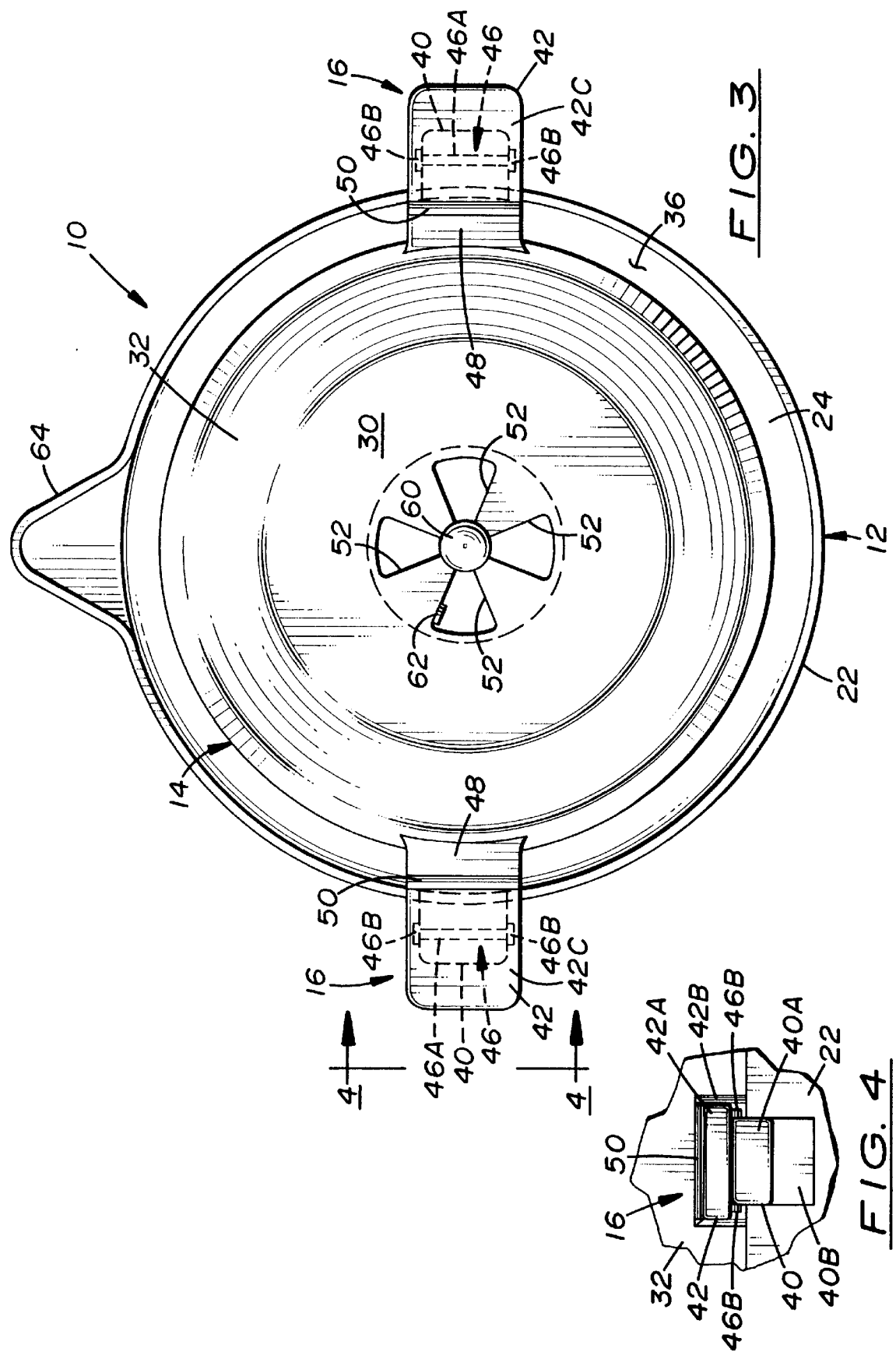

OVERFLOW PAN ASSEMBLY WITH SPLASHGUARD CAP

This patent application claims the benefit of U.S. provisional application No. 60/103,707, filed Oct. 9, 1998.

BACKGROUND OF THE INVENTION

1. Field of the Invention

The present invention generally relates to cookware and, more particularly, is concerned with an overflow pan assembly with a splashguard cap.

2. Description of the Prior Art

Pans with lids or covers are typically employed on stoves to cook food and boil water for any number of uses. Liquid contained in pans frequently overflows due to inattention as the temperature of the liquid rises and as vapor pressure increases under the lids on the pans. Various pans with lids have been developed over the years toward resolving this and other problems. Representative examples of prior art pans with lids are disclosed in U.S. Pat. No. 504,243 to Philippot, U.S. Pat. No. 1,461,366 to Mulford et al., U.S. Pat. No. 1,676,146 to Krafft, U.S. Pat. No. 1,810,860 to Tremblay, U.S. Pat. No. 2,127,988 to Tarrant, U.S. Pat. No. 2,385,594 to Witte, Jr., U.S. Pat. No. 5,033,453 to Loyd et al., U.S. Pat. No. 5,193,524 to Loyd et al., Danish Pat. No. 26,919 to Holm and German Pat. No. 696,673 to Boecker. While these prior art pans with lids appear to be satisfactory in use for the specific purposes for which they were designed, none of them seem to provide a comprehensive and effective solution to prevent liquid overflow.

Consequently, a need still exists for an assembly which provides an optimum solution to the aforementioned problem in the prior art without introducing any new problems in place thereof.

SUMMARY OF THE INVENTION

The present invention provides an overflow pan assembly designed to satisfy the aforementioned need. The overflow pan assembly of the present invention provides a pan with a cap forming an upper catch chamber outside the cap which receives and directs overflow liquid from the exterior of the cap back into the lower cooking chamber of the pan through an equalizing gap formed between the cap and pan when the cap is placed in an elevated opened position relative to the pan. The overflow pan assembly thus solves the aforementioned problem of the prior art by preventing liquid from overflowing the pan when unattended by the user.

Accordingly, the present invention is directed to an overflow pan assembly which comprises: (a) a pan including (i) a bottom wall having a periphery, (ii) a lower side wall having an annular shape, an upper end of a first diameter, and a lower end connected to and extending upwardly from the periphery of the bottom wall such that the lower side wall and bottom wall of the pan form a lower cooking chamber, (iii) an upper side wall having an annular shape, an upper end and a lower end of a second diameter greater than the first diameter of the upper end of the lower side wall, and (iv) a ledge having an annular shape extending between and interconnecting the upper end of the lower side wall and the lower end of the upper side wall, the upper side wall and ledge of the pan forming an upper reservoir chamber of the pan above the lower cooking chamber thereof; (b) a cap including (i) a top wall having a periphery, and (ii) a side wall having an annular shape, an upper end connected to and extending downwardly from the periphery of the top wall such that the side wall and top wall of the cap form an inner splash chamber within the cap and above the lower cooking chamber and intersecting with the upper reservoir chamber of the pan, the side wall of the cap also having a lower end of a third diameter greater than the first diameter of the upper end of the lower side wall of the pan and less than the second diameter of the lower end of the upper side wall of the pan, the side wall of the cap and the upper side wall and ledge of the pan forming an outer catch chamber outside the cap and within the upper reservoir chamber of the pan; and (c) positioning means for disposing the cap at either one of an opened position and a closed position relative to the pan such that in the opened position of the cap the lower end of the side wall of the cap is spaced above the ledge of the pan so as to thereby form a gap therebetween whereby fluid is allowed to pass through the gap between the lower cooking chamber and outer catch chamber whereas in the closed position the lower end of the side wall of the cap is disposed on the ledge of the pan to thereby close the gap therebetween whereby fluid is prevented from passing through the gap between the lower cooking chamber and outer catch chamber.

More particularly, the positioning means includes a pair of first handles mounted to the pan and a pair of second handles mounted to the cap. The first handles are mounted to and extend outwardly from the upper side wall of the pan opposite from one another and adjacent to the upper end of the upper side wall. The second handles are mounted to and extend outwardly from the side wall of the cap opposite from one another and between and spaced from the upper and lower ends of the side wall. Each of the second handles of the cap is pairable with and restable upon one of the first handles of the pan such that by resting the second handles upon the first handles the cap is retained in the opened position relative to the pan whereas by separating the second handles of the cap from the first handles of the pan the cap is disposed in the closed position relative to the pan.

The first and second handles have complementary first and second detent means formed thereon which are mateable with one another when the second handles are resting on the first handles for enabling centering of the cap over the pan and relative to the annular ledge of the pan. The first and second detent means are complementary recesses and protrusions formed on the first and second handles so as to face toward each other when the second handles are resting on the first handles. The second handles have top surfaces with inner portions adjacent to where the second handles are mounted to the side wall of the cap. The inner portions have depressions formed therein adjacent to the side wall of the cap so as to direct liquid traveling down an exterior surface of the cap into the outer catch chamber.

The cap also has at least one and preferably a plurality of vent holes defined in the top wall of the cap. The cap further has a vent closure member rotatably mounted to and disposed below the top wall of the cap to undergo rotation between first and second positions angularly displaced from one another such that the vent closure member covers and thus closes the vent holes of the cap in the first position and uncovers and thus opens the vent holes in the second position. The vent closure member has a lever mounted thereon and projecting through the top wall of the cap for allowing a user to grasp the lever to rotate the vent closure member.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 3 is a top plan view of the overflow pan assembly.

FIG. 4 is a detailed view of a positioning means of the assembly as seen along line 4—4 of FIG. 3.

DETAILED DESCRIPTION OF THE INVENTION

Figure 1:
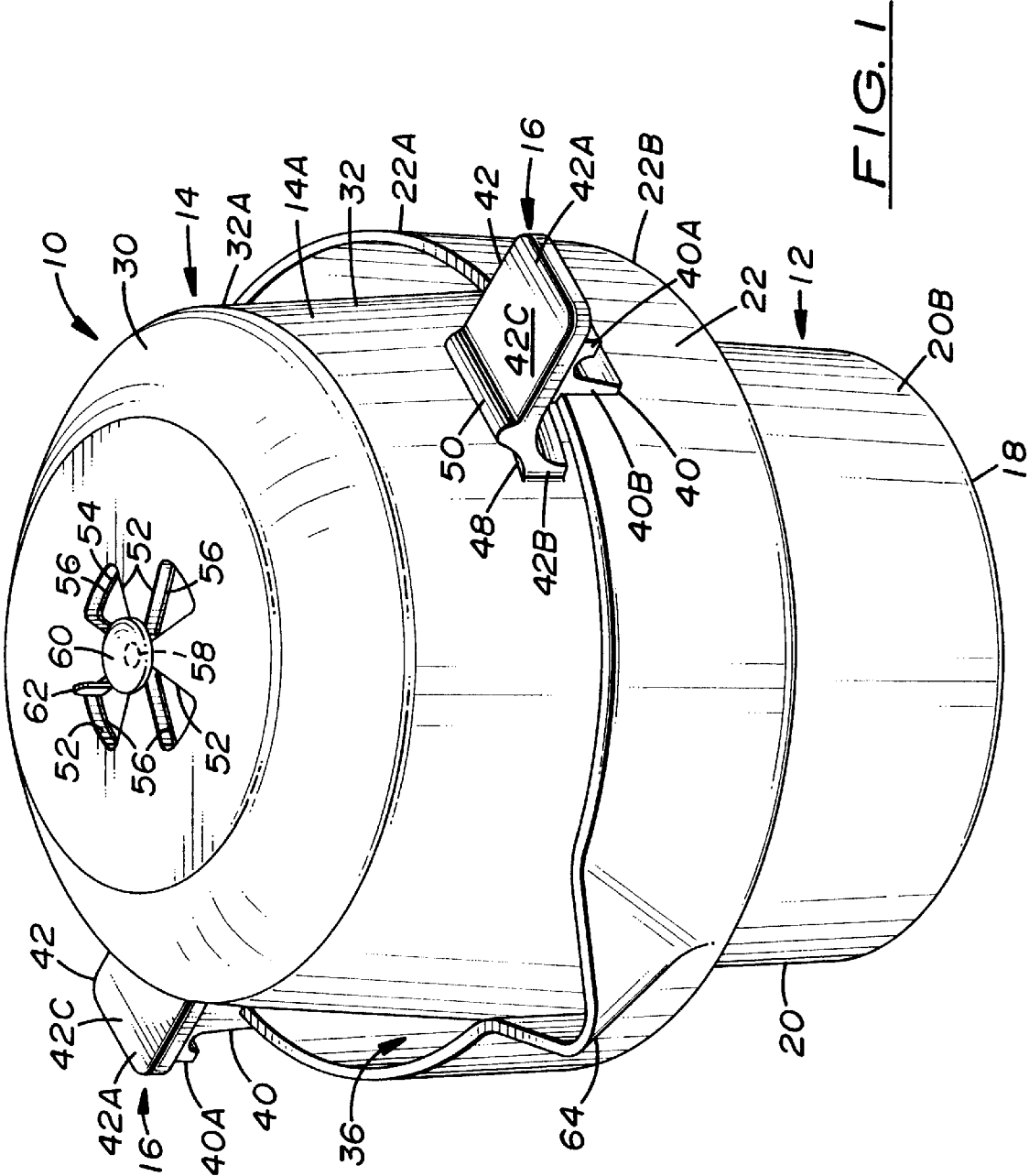
FIG. 1 is a perspective view of an overflow pan assembly of the present invention.

Referring to the drawings and particularly to FIG. 1, there is illustrated an overflow pan assembly, generally designated 10, of the present invention. The overflow pan assembly 10 basically includes a pan 12, a cap 14 and a positioning means 16. The cap 14 may be placed on and removed from the pan 12. The positioning means 16 is adapted to dispose the cap 14 at either one of an opened position, seen in solid line form at A in FIG. 2, and a closed position, seen in dashed line form at B in FIG. 2, relative to the pan 12.

Figure 2:
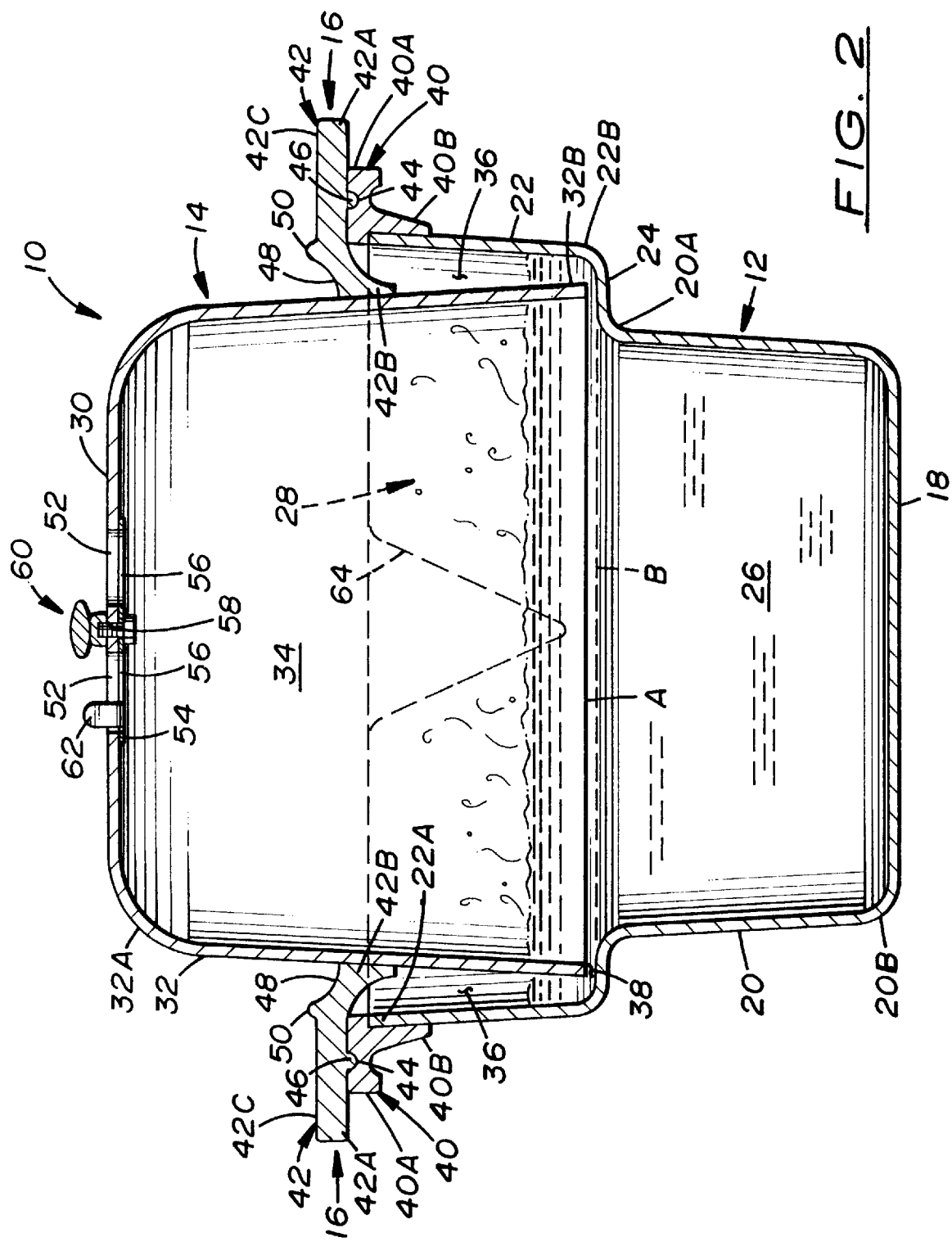
FIG. 2 is a vertical sectional view of the overflow pan assembly.

Referring now to FIGS. 1 to 3, the pan 12 of the assembly 10 has a bottom wall 18, a lower side wall 20, an upper side wall 22, and a ledge 24. The bottom wall 18 of the pan 12 has a substantially flat circular configuration. The lower side wall 20 of the pan 12 has a substantially annular shape and a continuous upper end 20A and a continuous lower end 20B. The lower side wall 20 diverges slightly from the lower end 20B, adjacent to the bottom wall 18, to the upper end 20A, adjacent to the ledge 24. The diameter at the upper end 20A of the lower side wall 20 is slightly greater than the diameter at the lower end 20B thereof. Preferably, the upper and lower ends 20A, 20B are rounded with the curvature of the upper end 20A being in a direction opposite to the direction of the curvature of the lower end 20B. The lower side wall 20 at its lower end 20B is connected to the periphery of the bottom wall 18 and extends upwardly therefrom such that the bottom wall 18 and lower side wall 20 together form a lower cooking chamber 26 of the pan 12.

The upper side wall 22 of the pan 12 has a substantially annular shape and a continuous upper end 22A and a continuous lower end 22B. The upper side wall 22 diverges slightly from the lower end 22B, adjacent to the ledge 24, to the upper end 22A. The upper side wall 22 also has a diameter at the upper end 22A which is slightly greater than the diameter at the lower end 22B of the upper side wall 22. The lower end 22B of the upper side wall 22 is rounded and merges into the outer diameter of the ledge 24 while the upper end 22A provides a top rim of the pan 12. The lower end 22B of the upper side wall 22 has a curvature opposite to that of the upper end 20A of the lower side wall 20. The lower and upper side walls 20, 22 of the pan 12 are disposed in vertically offset but approximately parallel relation to one another. The lower side wall 20 has a height greater than that of the upper side wall 22.

The ledge 24 of the pan 12 extends between and merges into and thus interconnects the upper end 20A of the lower side wall 20 and the lower end 22B of the upper side wall 22. The ledge 24 has a generally continuous annular shape and is inclined outwardly rising slightly from the upper end 20A of the lower side wall 20 to the lower end 22B of the upper side wall 22. The upper side wall 22 and ledge 24 of the pan 12 together form an upper reservoir chamber 28 of the pan 12 above the lower cooking chamber 26 thereof. The upper reservoir chamber 28 has a capacity approximately equal to the capacity of the lower cooking chamber 26 which serves to control any overflow when the cap 14 is removed from the pan 12 and the cooking contents are being stirred.

The cap 14 of the assembly 10 has a top wall 30 and a side wall 32. The top wall 30 has a substantially circular configuration and can be relatively flat or dome-shaped as desired. The side wall 32 has a substantially annular shape and a continuous upper end 32A and a continuous lower end 32B. The side wall 32 at its upper end 32A is connected to the periphery of the top wall 30 and extends downwardly therefrom such that the top wall 30 and side wall 32 together form an inner splash chamber 34 within the cap 14 and above the lower cooking chamber 26 of the pan 12 and also intersecting with the upper reservoir chamber 28 of the pan 12. The side wall 32 diverges slightly from the upper end 32A, adjacent to the top wall 30, to the lower end 32B. The diameter at the lower end 32B of the side wall 32 is slightly greater than the diameter at the upper end 32A thereof. The diameter at the upper end 32A of the side wall 32 of the cap 14 is approximately the same as the diameter of the upper end 20A of the lower side wall 20 of the pan 12. The upper end 32A of the side wall 32 is rounded where it merges from the top wall 30 of the cap 14. The lower end 32B of the side wall 32 provides a bottom rim on the cap 14. The diameter of the lower end 32B of the side wall 32 of the cap 14 is greater than the diameter of the top end 20A of the lower side wall 20 of the pan 12 but is less than the diameter of the lower end 22B of the upper side wall 22 of the pan 12 whereby the bottom rim of the cap 14 can be disposed generally centrally about and above the ledge 24 of the pan 12. The height of the side wall 32 of the cap 14 preferably is similar to the height of the pan 12.

When placed on the pan 12 as seen in FIG. 2, the cap 14 is disposed partially within the upper reservoir chamber 28 of the pan 12. As mentioned above, the top wall 30 and side wall 32 of the cap 14 form the inner splash chamber 34 inside the cap 14 above the lower cooking chamber 26 of the pan 12. The side wall 32 of the cap 14 and the upper side wall 22 and ledge 24 of the pan 12 together form an outer catch chamber 36 outside the cap 14 and within the upper reservoir chamber 28 of the pan 12.

Referring now to FIGS. 1 to 4, the positioning means 16 facilitates placement of the cap 14 at either one of the opened position and closed position as represented by the lower end 32B of the cap 14 being disposed either at position A or position B shown in FIG. 2. When the cap 14 is in the opened position, the lower end 32B of the side wall 32 of the cap 14 is elevated above and prevented from contacting the ledge 24 of the pan 12 and thereby provides an equalizing gap 38 between the lower end 32B of the side wall 32 of the cap 14 and the ledge 24 of the pan 12 such that liquid may pass through the gap 38 into and from the inner splash chamber 34 of the cap 14 and into and from the outer catch chamber 36 of the cap 14 and the pan 12. In view that the lower end 32B of the side wall 32 of the cap 14 is elevated above the ledge 24 but still submerged in liquid on both sides, a liquid seal is provided through the gap 38 which prevents froth and boiling activity in the inner splash chamber 34 from affecting liquid in the outer catch chamber 36. Thus, the lower cooking chamber 26 is covered and all activity due to boiling surfaces remains within the inner splash chamber 34. When the cap 14 is in the closed position, the lower end 32B of the side wall 32 of the cap 14 rests on the ledge 24 of the pan 12 and thereby closes the gap 38 between the lower end 32B of the side wall 32 of the cap 14 and the ledge 24 of the pan 12 such that liquid is prevented from passing through the gap 38.

More particularly, the positioning means 16 preferably is in the form of a pair of first handles 40 mounted to the pan 12 and a pair of second handles 42 mounted to the cap 14. The first handles 40 are mounted to the upper side wall 22 of the pan 12 substantially opposite from one another and adjacent to and extending outwardly from the upper end 22A of the upper side wall 22. Each first handle 40 extends farther outwardly from the upper side wall 22 than above the upper side wall 22 and, as an example, has a substantially J-shaped configuration in cross-section and an outer portion 40A and an inner portion 40B. The outer portion 40A of each first handle 40 extends outwardly from the upper side wall 22 while the inner portion 40B thereof extends along the upper side wall 22. Each first handle 40 has a substantially uniform width along the outer and inner portions 40A, 40B thereof and a substantially rectangular configuration when viewed from above. Each first handle 40 is mounted to the upper side wall 22 of the pan 12 by any suitable means, such as by screw fasteners (not shown).

The second handles 42 are mounted to the side wall 32 of the cap 14 substantially opposite from one another and between and spaced from the upper and lower ends 32A, 32B of the side wall 32 and extend outwardly from the side wall 32. Each second handle 42, as an example, has a substantially J-shaped configuration in cross-section and an outer portion 42A and an inner portion 42B. The outer portion 42A of each second handle 42 extends outwardly from the side wall 32 while the inner portion 42B of each second handle 42 extends along the side wall 32. The outer portion 42A of each second handle 42 has a length substantially greater than the length of the inner portion 42B thereof and of the length of the outer portion 40B of each first handle 40 such that the second handles 42 are easy to grasp by the user. Each second handle 42 has a substantially uniform width along the outer and inner portions 42A, 42B thereof. The width of each second handle 42 of the cap 14 also is greater than the width of each first handle 40 of the pan 12, as shown in FIGS. 3 and 4. Each second handle 42 has a substantially rectangular configuration when viewed from above. Each second handle 42 is mounted to the side wall 32 of the cap 14 by any suitable means, such as by screw fasteners (not shown).

Each second handle 42 of the cap 14 is pairable with and restable upon one of the first handles 40 of the pan 12 such that the resting of the second handles 42 upon the first handles 40 retains the cap 14 in the open position hanging by its pair of second handles 42 over the pan 12 with its splash chamber 34 rising above all possible liquid levels. The second handles 42 of the cap 14 are separable from the first handles 40 of the pan 12 to place the cap 14 in the closed position. In the closed position, the cap 14 sits with its lower end 32B resting on the ledge 24 of the pan 12. In this position, the cap 14 acts as a lid that can either be closed or vented as described below. The substantially J-shaped cross-sectional configuration of each second handle 42 allows for centering of the cap 14 relative to the ledge 24 of the pan 12. This centering of the cap 14 relative to the ledge 24 of the pan 12 is accomplished when the outer portions 42A of the second handles 42 are resting flush on the outer portions 40A of the first handles 40. The J-shaped configuration of each second handle 42 causes both sides of the cap 14 to rise when the outer portions 42A of the second handles 42 are not resting flush on the outer portions 40A of the first handles 40.

The first and second handles 40, 42 also can have complementary first and second detent means 44, 46 formed thereon which are interfittable or mateable with one another when the second handles 42 are resting on the first handles 40 for easier achievement and retention of the centering of the cap 14 over the pan 12 relative to the annular ledge 24 of the pan 12. The first and second detent means 44, 46 preferably take the form of complementary paired recesses 44 and protrusions 46 formed on the first and second handles 40, 42 so as to face toward and align and interfit with each other when the second handles 42 are resting on the first handles 40. Each protrusion 46 has a center portion 46A which fits into one of the recesses 44 and a pair of opposite end portions 46B which extend in transverse relationship to the center portion 46A and fit along opposite sides of the respective second handle 42 adjacent to the opposite ends of the respective recess 44. The center and opposite end portions 46A, 46B, which along their respective lengths lie in orthogonal relationship to one another, prevent horizontal movement of the cap 14 in any direction relative to the pan 12 and hold the cap 14 in an exactly dead centered alignment over the pan 12.

The second handles 42 have top surfaces 42C with portions thereof adjacent to where the second handles 42 are mounted to the exterior of the side wall 32 of the cap 14 having depressions 48 so as to direct liquid traveling down an exterior surface 14A of the cap 14 into the outer catch chamber 36 instead of allowing the liquid to travel outwardly along the exterior surfaces 42C of the second handles 42. Also, optionally, each second handle 42 can have a bead 50 formed on the top surface 42C along an edge of the depression 48 opposite from the side wall 32 of the cap 14 which serves as a further barrier to liquid traveling outwardly from the cap 14 on the top surface 42C of the second handle 42.

The cap 14 of the assembly 10 also has one or more and, preferably, four vent holes 52 defined in the top wall 30 of the cap 14. The vent holes 52 are spaced apart an equal distance from one another. By way of example, each vent hole 52 can have a substantially triangular configuration, as shown, or may have any other suitable configuration. The assembly 10 further comprises a vent closure member 54. The vent closure member 54 has a generally circular configuration and is rotatably mounted at the center thereof to the center of the top wall 30 of the cap 14 and is disposed below the top wall 30 of the cap 14 within the inner splash chamber 34 of the cap 14. The vent closure member 54 defines one or more and, preferably, four vent apertures 56. The vent apertures 56 are spaced apart an equal distance from one another and can have any desired shape. By way of example, each vent aperture 56 has a substantially triangular configuration. The vent apertures 56 of the vent closure member 54 have sizes and spacing substantially the same as the vent holes 52 of the cap 14. The cap 14 also has a central hole 58 defined in the top wall 30 of the cap 14 and a fastener assembly 60 releasably mounting the vent closure member 54 to the top wall 30 of the cap 14. Further still, the vent closure member 54 has a lever 62 mounted thereon and extending through the top wall 30 of the cap 14 for allowing a user to grasp the lever 62 to rotate the vent closure member 54. The lever 62 is a finger-tip type.

The vent closure member 54 is rotatable such that the vent holes 52 of the cap 14 may be closed and open to varying degrees by the vent apertures 56 of the vent closure member 54 being moved away from and toward alignment with the vent holes 52 of the cap 14. The overlapping of the vent holes 52 and vent apertures 56 allows for passage of steam therethrough from the inner splash chamber 34 of the cap 14 to the exterior surface 14A of the cap 14 and the external environment. The outer catch chamber 36 is always open to the external environment. The combination of open vent holes 52 of the cap 14 and the open outer catch chamber 36 enables the assembly 10 to relieve steam pressure and reduce the amount of fluid overflow. The inner splash chamber 34 of the cap 14 extends to a height above the lower cooking chamber 26 of the pan 12 sufficient to provide adequate room for foam or froth control. Froth from liquid boiling in the lower cooking chamber 26 of the pan 12 that elevates sufficiently within the inner splash chamber 34 may pass through the aligned vent holes and apertures 52, 56 of the cap 14 and vent closure member 54 and condense on an exterior surface 14A of the cap 14 and run as liquid back down and into the outer catch chamber 36 and reenter the lower cooking chamber 26 via the equalizing gap 38 therebetween. This condensation enables the assembly 10 to held maintain liquid in the lower cooking chamber 26 of the pan 12 and to reduce the instances of overflow of the pan 12 and of boiling the pan dry. Furthermore, when cooking foods that require it, the extra capacity of the outer catch chamber 36 provides the opportunity for a user to add extra water without removing the cap 14 by simply pouring the water into the outer catch chamber 36. The outer catch chamber 36 will funnel the water into the lower cooking chamber 26 via the equalizing gap 38. The pan 12 also has a spout 64 defined on the top edge 22A of the upper side wall 22 of the pan 12. The spout 64 is a pitcher-type. The spout 64 is located halfway between the first handles 40 of the pan 12.

To recapitulate, when the cap 14 is in the opened hanging position, it divides the upper reservoir chamber 28 of the pan 12 into the inner splash chamber 34 and outer catch chamber 36 united by a liquid seal at the gap 38 through which liquid is free to flow and seek its own level. Also, steam can be vented as it is generated, eliminating steam pressure problems within the splash chamber 34. The outer catch chamber 36 remains unaffected by the activity taking place within the splash chamber 34. All expelled froth and liquid are caught in the catch chamber 36 and returned to the cooking chamber 26 as the liquid seeks its own level by passing through the equalizing gap 38. Another advantage is that liquid can be added to the cooking chamber 26 without removing the cap 14 simply by pouring it into the outer catch chamber 36. This eliminates the need to remove a dripping cap 14 in order to replenish liquid to the cooking chamber 26. The second handles 42 of the cap 14 are slightly longer than the first handles 40 of the pan 12 to make lifting or adjustment easier. As the cap 14 is removed from the pan 12, the upper reservoir chamber 28 is formed. This chamber 28 has approximately the same volume capacity as the lower cooking chamber 26, but has approximately two and one-quarter times greater surface area. When cooking volatile foods that need to be stirred constantly, these capabilities become invaluable. As frothy contents of the cooking chamber 26 expand, the space to contain and control them, plus the greater exposure to atmospheric cooling to quiet them, is provided in the upper reservoir chamber 28. Further, to drain excess liquid after cooking, the user's hands are placed to either side of the rising steam and the weight of the assembly 10 is evenly distributed by the handles 40, 42. Liquid drains freely through the gap 38 while the cap 14 is held firmly in place with both hands as all food is retained in the cooking chamber 26. Liquid is consolidated into a stream by the pitcher spout 64 eliminating drips during the draining process.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. An overflow pan assembly, comprising:
   (a) a pan including
      (i) a bottom wall having a periphery,
      (ii) a lower side wall having a substantially annular shape, an upper end of a first diameter, and a lower end connected to and extending upwardly from said periphery of said bottom wall such that said bottom wall and lower side wall of said pan form a lower cooking chamber of said pan,
      (iii) an upper side wall having a substantially annular shape, an upper end and a lower end of a second diameter greater than said first diameter of said upper end of said lower side wall, and
      (iv) a ledge having a substantially annular shape extending between and interconnecting said upper end of said lower side wall and said lower end of said upper side wall, said upper side wall and ledge of said pan forming an upper reservoir chamber of said pan above said lower cooking chamber thereof;
   (b) a cap including
      (i) a top wall having a periphery, and
      (ii) a side wall having a substantially annular shape, an upper end connected to and extending downwardly from said periphery of said top wall such that said side wall and top wall of said cap form an inner splash chamber within said cap and above said lower cooking chamber of said pan and intersecting with said upper reservoir chamber of said pan, said side wall of said cap also having a lower end of a third diameter greater than said first diameter of said upper end of said lower side wall of said pan and less than said second diameter of said lower end of said upper side wall of said pan, said side wall of said cap and said upper side wall and ledge of said pan forming an outer catch chamber outside said cap and within said upper reservoir chamber of said pan; and
   (c) positioning means for disposing said cap at either one of an opened position and a closed position relative to said pan such that in said opened position of said cap said lower end of said side wall of said cap is spaced above said ledge of said pan so as to thereby form a gap therebetween whereby fluid is allowed to pass through said gap between said lower cooking chamber and outer catch chamber whereas in said closed position said lower end of said side wall of said cap is disposed on said ledge of said pan to thereby close said gap therebetween whereby fluid is prevented from passing through said gap between said lower cooking chamber and outer catch chamber.

2. The assembly of claim 1 wherein said positioning means includes a pair of first handles mounted to said pan and a pair of second handles mounted to said cap.

3. The assembly of claim 2 wherein said first handles are mounted to said upper side wall of said pan substantially opposite from one another and adjacent to said upper end of said upper side wall of said pan, said first handles extending outwardly from said upper side wall of said pan.

4. The assembly of claim 3 wherein said second handles are mounted to said side wall of said cap substantially opposite from one another and between and spaced from said upper and lower ends of said side wall of said cap, said second handles extending outwardly from said side wall of said cap, each of said second handles of said cap being pairable with and restable upon one of said first handles of said pan such that by resting said second handles of said cap upon said first handles of said pan said cap is retained in said opened position relative to said pan whereas by separating said second handles of said cap from said first handles of said pan said cap is disposed in said closed position relative to said pan.

5. The assembly of claim 4 wherein said first and second handles have complementary first and second detent means formed thereon which are mateable with one another when said second handles are resting on said first handles for enabling centering of said cap over said pan and relative to said annular ledge of said pan.

6. The assembly of claim 5 wherein said first detent means is one of a recess or protrusion being formed on said each of said first handles so as to face toward each of said second handles.

7. The assembly of claim 6 wherein said second detent means is the other of said recess or protrusion being formed on each of said second handles so as to face toward and interfit with said one of said recess or protrusion on each of said first handles when said second handles are resting on said first handles.

8. The assembly of claim 2 wherein said second handles have top surfaces with inner portions adjacent to where said second handles are mounted to said side wall of said cap, said inner portions having depressions formed therein adjacent to said side wall of said cap so as to direct liquid traveling down an exterior surface of said cap into said outer catch chamber.

9. The assembly of claim 8 wherein each of said second handles has a bead formed along an edge of said depression opposite said side wall of said cap which serves as a barrier to liquid traveling outwardly from said cap on said top surface of said second handle.

10. The assembly of claim 1 wherein said pan includes a spout defined on said top edge of said upper side wall of said pan.

11. The assembly of claim 1 wherein said cap includes at least one vent hole defined in said top wall of said cap.

12. The assembly of claim 11 further comprising:
a vent closure member rotatably mounted to and disposed below said top wall of said cap to undergo rotation between first and second positions angularly displaced from one another such that said vent closure member covers and thus closes said at least one vent hole of said cap in said first position of said vent closure member and uncovers and thus opens said one vent hole of said cap in a second position of said vent closure member.

13. The assembly of claim 12 wherein said vent closure member has a lever mounted thereon and projecting through said top wall of said cap for allowing a user to grasp said lever to rotate said vent closure member.

14. The assembly of claim 12 wherein said vent closure member defines at least one vent aperture.

15. The assembly of claim 14 wherein said vent closure member is rotatable such that said vent hole of said cap may be closed and opened to varying degrees by said vent aperture of said vent closure member being out and in alignment with said vent hole of said cap such that opening said vent hole of said cap allows for passage of steam therethrough from said inner splash chamber of said cap to an external environment.

16. The assembly of claim 12 further comprising:
a fastener assembly releasably mounting said vent closure member to said top wall of said cap.

17. The assembly of claim 1 wherein said lower side wall of said pan diverges slightly from said lower end of said lower side wall to said upper end of said lower side wall.

18. The assembly of claim 1 wherein said upper side wall of said pan diverges slightly from said lower end of said upper side wall to said upper end of said upper side wall.

19. The assembly of claim 1 wherein said ledge of said pan is inclined outwardly rising slightly from said upper end of said lower side wall of said pan to said lower end of said upper side wall of said pan.

20. The assembly of claim 1 wherein said side wall of said cap diverges slightly from said upper end of said side wall to said lower end of said side wall.

* * * * *